(12) United States Patent
Casey

(10) Patent No.: US 6,654,351 B1
(45) Date of Patent: Nov. 25, 2003

(54) CONFIGURABLE MULTI-PROTOCOL VEHICLE COMMUNICATION CIRCUIT AND METHOD

(75) Inventor: Colin Casey, Columbus, IN (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/521,404

(22) Filed: Mar. 8, 2000

(51) Int. Cl.[7] .............................................. G01R 31/08
(52) U.S. Cl. ...................................... 370/252; 324/605
(58) Field of Search ................................ 370/252, 241, 370/466, 467, 469; 324/600, 602, 605, 606, 609, 76.11, 98; 340/500, 501, 540

(56) References Cited

U.S. PATENT DOCUMENTS

| | | | |
|---|---|---|---|
| 4,656,475 A | * 4/1987 | Miller et al. | ............ 340/825.57 |
| 4,986,183 A | * 1/1991 | Jacob et al. | ................. 102/200 |
| 5,935,224 A | * 8/1999 | Svancarek et al. | ............ 710/63 |
| 6,384,723 B1 | * 5/2002 | Keeler et al. | ............... 340/513 |
| 6,498,563 B1 | * 12/2002 | Tice et al. | .................. 340/504 |

* cited by examiner

Primary Examiner—David Vincent
(74) Attorney, Agent, or Firm—Thomas V. Miller; Brian M. Mancini

(57) ABSTRACT

A communication circuit places two communication terminals in high-impedance states, senses voltages at the two communication terminals, and determines a communication mode based on the voltages. Thereafter, the communication circuit communicates in the communication mode using the two communication terminals. The circuit is capable of communicating via the two communication terminals in any of a Serial Communications Interface (SCI) communication protocol and a Controller Area Network (CAN) communication protocol.

15 Claims, 2 Drawing Sheets

CONFIGURABLE MULTI-PROTOCOL VEHICLE COMMUNICATION CIRCUIT AND METHOD

TECHNICAL FIELD

The present invention relates to vehicle communication methods, systems and protocols.

BACKGROUND OF THE INVENTION

Several different communication protocols are used in passenger car and heavy vehicle automotive applications. These protocols include SAE J1939, SAE J1708 and ISO-9141. Most applications do not use all these protocols at the same time.

To meet different communication protocol requirements, an engine manufacturer may specify an engine control module (ECM) to include multiple communication circuits, each communication circuit dedicated for communicating in a corresponding protocol. Placing multiple communication circuits in one ECM disadvantageously makes the ECM larger and adds a cost burden to engine control.

Alternatively, an engine manufacturer may develop multiple models of ECMs, where each model is dedicated to one of a plurality of different communication protocols. Specifying several different ECMs disadvantageously causes additional development cost, additional fixed support cost, and higher piece cost due to redundant validation work, support of multiple models, and purchasing of ECMs at lower volume.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

Embodiments of the present invention advantageously provide a configurable circuit capable of meeting SAE J1939, SAE J1708, and ISO-9141 protocol requirements using the same output drive MOSFET (metal oxide semiconductor field effect transistor) switches. The configurable circuit includes multiplexers to multiplex transmit signals, receive signals and line terminations for the SAE J1939, SAE J1708, and ISO-9141 protocols. Interface circuits between a microprocessor and the multiplexers convert between microprocessor SCI (Serial Communication Interface) and CAN (Control Area Network) signals and SAE J1939, SAE J1708, and ISO-9141 signals. The communication protocol is self-determined at start-up by placing communication terminals in a high-impedance state, and sensing passive output voltages at the communication terminals generated by an external device connected thereto.

Figure 1:
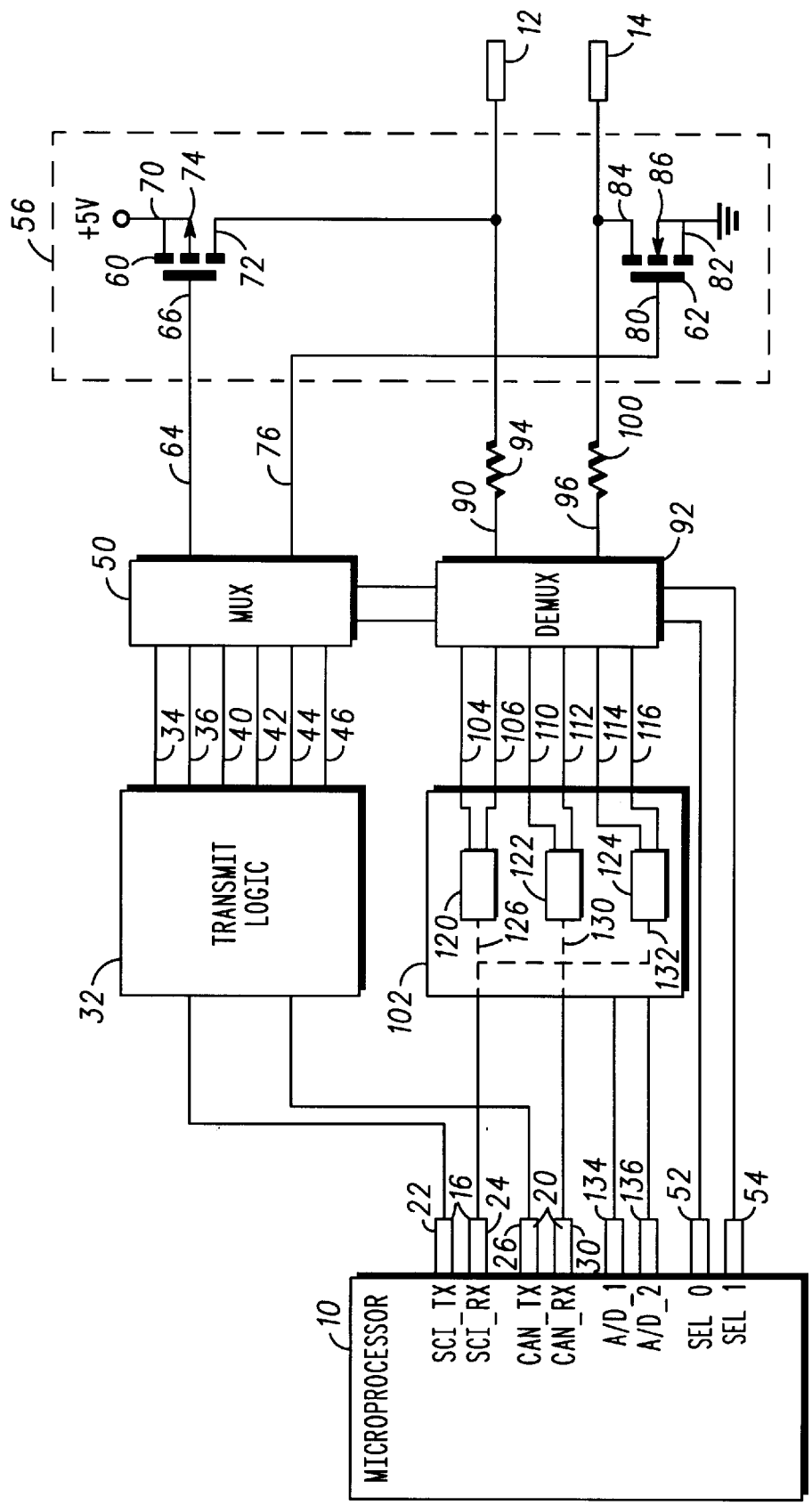
FIG. 1 is a schematic, block diagram of an embodiment of a configurable multi-protocol vehicle communication circuit.

FIG. 1 is a schematic, block diagram of an embodiment of a configurable multi-protocol vehicle communication circuit. The circuit is used for transmitting and receiving signals between a microprocessor 10 and communication terminals 12 and 14.

The microprocessor 10 has a first pair 16 and a second pair 20 of communication terminals. The first pair 16 comprises a transmit terminal 22 and a receive terminal 24. The first pair 16 is used for communicating signals in a first bit format, such as an SCI format. The second pair 20 comprises a transmit terminal 26 and a receive terminal 30. The second pair 20 is used for communicating signals in a second bit format, such as a CAN format.

A transmit logic circuit 32 is responsive to the transmit terminals 22 and 26 to produce output signals according to each of a plurality of communication modes. The transmit logic circuit 32 has outputs 34 and 36 for outputting signals in a first communication mode, such as an SAE J1708 communication mode, outputs 40 and 42 for outputting signals in a second communication mode, such as an SAE J1939 communication mode, and outputs 44 and 46 for outputting signals in a third communication mode, such as an ISO-9141 communication mode.

A multiplexer 50 is responsive to terminals 52 and 54 of the microprocessor 10 to selectively couple one of the output pairs of the transmit logic circuit 32 to an output drive stage 56. The output drive stage 56 comprises output drive switches 60 and 62. The output drive switch 60 may comprise a MOSFET switch such as a PMOSFET having part number MTD2955/MC. The output drive switch 62 may comprise a MOSFET switch such as an NMOSFET having part number MTD3055EL/MC.

A first output 64 of the multiplexer 50 is coupled to a gate 66 of the output drive switch 60. A source 70 of the output drive switch 60 is coupled to a power source supply line such as a 5 Volt supply line. A drain 72 of the output drive switch 60 is coupled to the communication terminal 12. A substrate 74 of the output drive switch 60 is coupled to the source 70.

A second output 76 of the multiplexer is coupled to a gate 80 of the output drive switch 62. A source 82 of the output drive switch 62 is coupled to a supply line such as ground. A drain 84 of the output drive switch 62 is coupled to the communication terminal 14. A substrate 86 of the output drive switch 60 is coupled to the source 82.

Therefore, using the terminals 52 and 54, the microprocessor 10 controls which of the three communication modes is to be used to transmit signals via the communication terminals 12 and 14.

The communication terminals 12 are also capable of receiving signals in a plurality of communication modes. The communication terminal 12 is coupled to a first input 90 of a demultiplexer 92 by a resistor 94. The communication terminal 14 is coupled to a second input 96 of the multiplexer 92 by a resistor 100. The demultiplexer 92 is responsive to the terminals 52 and 54 of the microprocessor 10 to selectively couple the communication terminals 12 and 14 to one of a plurality of input conditioning and line termination circuits 102.

The demultiplexer 92 has outputs 104 and 106 for signals received in the first communication mode, such as the SAE J1708 communication mode, outputs 110 and 112 for signals received in the second communication mode, such as the SAE J1939 communication mode, and outputs 114 and 116 for signals received in the third communication mode, such as the ISO-9141 communication mode.

The input conditioning and line termination circuits 102 comprises a circuit 120 coupled to the outputs 104 and 106, a circuit 122 coupled to the outputs 110 and 112, and a circuit 124 coupled to the outputs 114 and 116. The circuit 120 provides appropriate input conditioning and line termination for signals received in the first communication mode, such as the SAE J1708 communication mode. The circuit 122 provides appropriate input conditioning and line termination for signals received in the second communication mode, such as the SAE J1939 communication mode. The circuit 124 provides appropriate input conditioning and line termination for signals received in the third communication mode, such as the ISO-9141 communication mode.

An output 126 of the circuit 120 is coupled to receive terminal 24. An output 130 of the circuit 122 is coupled to the receive terminal 30. An output 132 of the circuit 124 is coupled to the receive terminal 24. Therefore, using the terminals 52 and 54, the microprocessor 10 controls which of the three communication modes is to be used to receive signals via the communication terminals 12 and 14.

At start-up, the configurable multi-protocol vehicle communication circuit is capable of self-determining the communication mode as follows. The microprocessor 10 generates signals at the terminals 52 and 54 to command the demultiplexer 92 to couple inputs 134 and 136 to the communication terminals 12 and 14, respectively, and to command the multiplexer 50 to uncouple the output drive stage 56 from the transmit terminals 22 and 26. In this way, the microprocessor 10 tri-states or otherwise places the communication terminals 12 and 14 in high input impedance states.

The inputs 134 and 136 may comprise inputs to analog-to-digital converters of the microprocessor 10. Via the input 134, the microprocessor 10 senses a first voltage at the communication terminal 12 while in the high-impedance state. Via the input 136, the microprocessor 10 senses a second voltage at the communication terminal 14 while in the high-impedance state.

The microprocessor 10 determines the communication mode based on the first voltage and the second voltage. If the first voltage is about 0 Volts and the second voltage is about 5 Volts, the microprocessor 10 determines that the communication mode is SAE J1708. If the first voltage is about 2.5 Volts and the second voltage is about 2.5 Volts, the microprocessor 10 determines that the communication mode is SAE J1939. If the first voltage is about 5 Volts and the second voltage is about 5 Volts, the microprocessor 10 determines that the communication mode is ISO-9141. If the first voltage is about 0 Volts and the second voltage is about 0 Volts, the microprocessor 10 determines that no external device is connected to the communication terminals 12 and 14.

As used herein with reference to voltage levels, the term "about" is inclusive of being equal to and being nearly equal to. As used herein, a voltage being "nearly equal to" a voltage level means that the voltage is closer to the voltage level (e.g. 5 Volts) than to other voltage levels (e.g. 0 Volts and 2.5 Volts). It is noted that in alternative embodiments, the microprocessor 10 may determine a communication mode based upon voltage levels other than 0 Volts, 2.5 Volts and 5 Volts.

After determining the communication mode, the microprocessor 10 generates signals at the terminals 52 and 54 to select which of the three communication modes is to be used to transmit and receive signals via the communication terminals 12 and 14. For the SAE J1708 and the ISO-9141 communication modes, the microprocessor 10 transmits and receives signals using the transmit terminal 22 and the receive terminal 24. For the SAE J1939 communication mode, the microprocessor transmits and receives signals using the transmit terminal 26 and the receive terminal 30. For the SAE J1708 communication mode, the microprocessor 10 further determines a suitable baud rate for communicating signals.

TABLE I summarizes differences in the three communication protocols. The microprocessor 10 cooperates with the other components of the configurable circuit to communicate in accordance with the specifications given in TABLE I. Each of the three communication protocols utilizes an NRZ (non-return to zero), passive "1", active "0" format.

TABLE I

| Standard | J1708 | J1939 | ISO-9141 |
|---|---|---|---|
| Bit Rate | 9600 bits/sec | 250 kbits/sec | 10.4 kbits/sec |
| Bit Format | UART | CAN | UART |
| Physical Layer | Twisted pair (RS-485) | Twisted pair + Shield | 2-wire K, L |
| Signaling | +5 V passive, −5 V active | −50 m V passive, 3 V active | Battery + passive, GND active |
| Fanout | 20 nodes | 32 nodes | N/A |
| Software Protocol | J1587, J1922 | J1939/71 | J1979, J2012 |
| Packet | 19 bytes | 8 bytes | 7 bytes |
| Error Detection | Checksum | CRC | Checksum |
| Collision/ Arbitration | Retransmit | Non-destructive | Restransmit |

Figure 2:
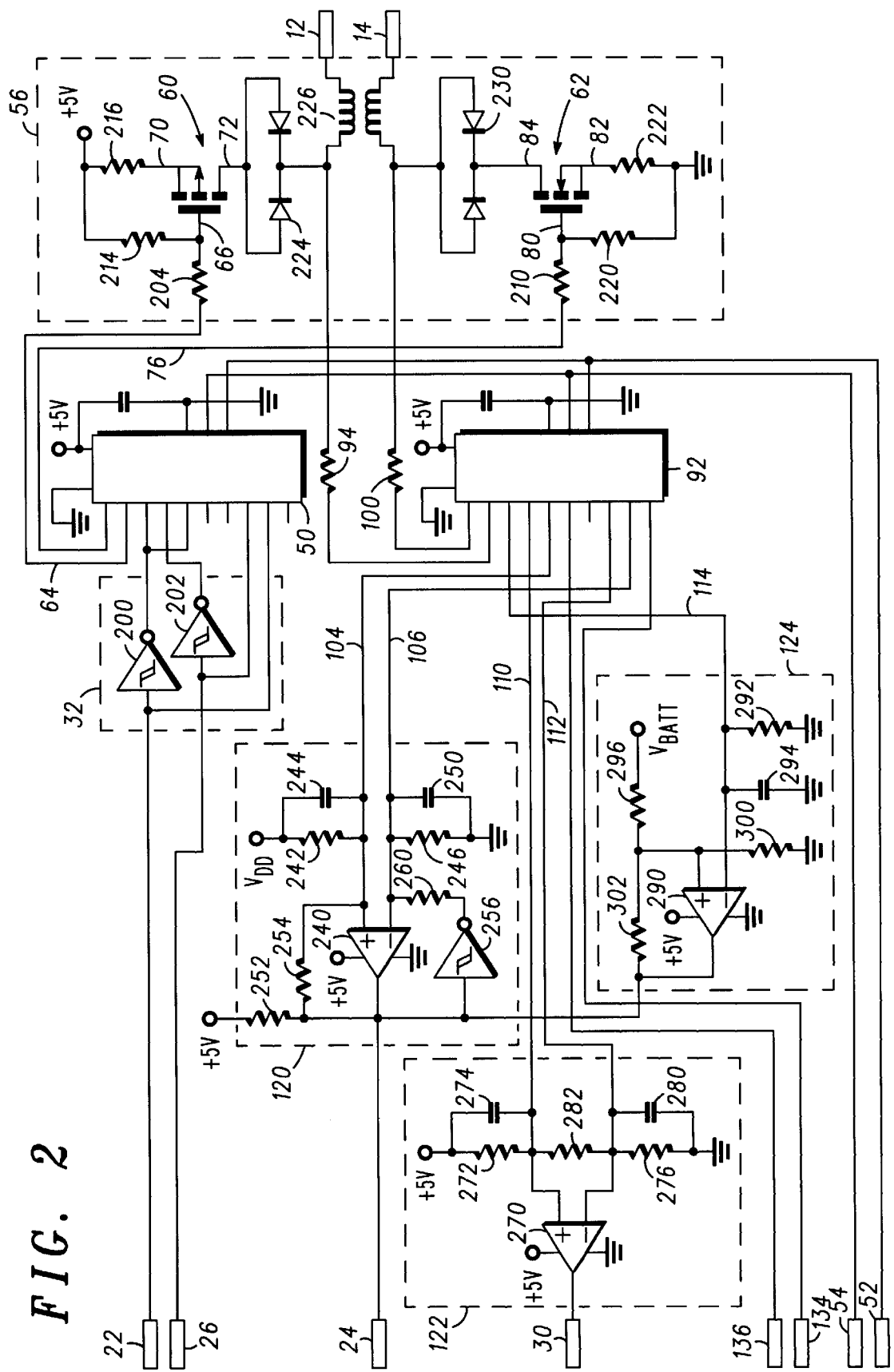
FIG. 2 is a schematic diagram of a portion of a preferred embodiment of a configurable multi-protocol vehicle communication circuit.

FIG. 2 is a schematic diagram of a portion of a preferred embodiment of a configurable multi-protocol vehicle communication circuit.

The transmit logic circuit 32 comprises an inverting Schmitt trigger 200 whose input is coupled to the transmit terminal 22, and an inverting Schmitt trigger 202 whose input is coupled to the transmit terminal 26. The inverting Schmitt triggers 200 and 202 may comprise those having part number 74HC14. Signals in the SAE J1708 communication mode are provided by the transmit terminal 22 and an output of the inverting Schmitt trigger 200. Signals in the SAE J1939 communication mode are provided by the transmit terminal 26 and an output of the inverting Schmitt trigger 202. Signals in the ISO-9141 communication mode are provided by the output of the inverting Schmitt trigger 200.

The multiplexer 50 comprises a dual 4:1 analog multiplexer having part number 74HC4052. The multipexer 50 is configured to selectively provide signals to the output drive stage 56 in a communication mode dependent upon logical "0 s"or "1 s" from the terminals 52 and 54. The relationship between the communication modes and signals from the terminals 52 and 54 is shown in TABLE II.

TABLE II

| TERMINAL 52 | TERMINAL 54 | COMMUNICATION MODE |
|---|---|---|
| 0 | 0 | Tri-state |
| 0 | 1 | J1708 |
| 1 | 0 | J1939 |
| 1 | 1 | ISO-9141 |

The output drive stage 56 is similar to that specified in SAE J1939, PART 11. A resistor 204 couples the output 64 of the multiplexer 50 to the gate 66 of the output drive switch 60. A resistor 210 couples the output 76 of the multiplexer 50 to the gate 80 of the output drive switch 62. A resistor 214 couples the gate 66 of the output drive switch 60 to the 5 volt power supply line. A resistor 216 couples the source 70 of the output drive switch 60 to the 5 Volt power supply line. A resistor 220 couples the gate 80 of the output drive switch 62 to ground. A resistor 222 couples the source 82 of the output drive switch 62 to ground.

The drain 72 of the output drive switch 60 is coupled to the communication terminal 12 via reverse blocking diodes 224 and a transformer 226. The drain 84 of the output drive switch 62 is coupled to the communication terminal 14 via reverse blocking diodes 230 and the transformer 226. The output drive switches 60 and 62 are protected from short-to-battery, short-to-ground, and reverse-battery conditions by the reverse blocking diodes 224 and 230, and the current-limiting source resistors 216 and 222.

The demultiplexer 92 comprises a dual 4:1 analog multiplexer-demultiplexer having part number 74HC4052. The demultiplexer 92 is configured to selectively couple signals from the communication terminals 12 and 14 to one of the input conditioning and line termination circuits 102 dependent upon logical "0s" or "1s" from the terminals 52 and 54. The input conditioning and line termination circuits 102 are identified by signals from the terminals 52 and 54 as shown in TABLE III.

TABLE III

| TERMINAL 52 | TERMINAL 54 | INPUT CONDITIONING AND LINE TERMINATION CIRCUIT |
|---|---|---|
| 0 | 0 | — |
| 0 | 1 | CIRCUIT 120 |
| 1 | 0 | CIRCUIT 122 |
| 1 | 1 | CIRCUIT 124 |

The circuit 120 comprises a comparator 240, such as one having part number LM393. The comparator 240 has a non-inverting input coupled to the output 104 of the demultiplexer 92, and an inverting input coupled to the output 106 of the demultiplexer 92. A parallel combination of a resistor 242 and a capacitor 244 are coupled between the non-inverting input and a supply line VDD. A parallel combination of a resistor 246 and a capacitor 250 are coupled between the inverting input and ground. An output of the comparator 240 is coupled a 5 Volt supply line by a resistor 252. A resistor 254 couples the output of the comparator 240 to the non-inverting input. A series combination of an inverting Schmitt trigger 256 and a resistor 260 couples the output of the comparator 240 to the inverting input. The output of the comparator 240 is coupled to the receive terminal 24.

The circuit 120 provides a comparator circuit which produces an output based upon the standard SAE definition of voltages for "1s" and "0s" for the J1708 protocol. The circuit 120 also provides line termination characteristics in accordance with SAE J1708. In particular, the circuit 120 provides a termination impedance of about 4.7 kOhms, and is suitable for a load having a pull-up resistance of about 4.7 kOhms to the communication terminal 14 and a pull-down resistance of about 4.7 kohms to the communication terminal 12.

The circuit 122 comprises a comparator 270, such as one having part number LM393. The comparator 270 has a non-inverting input coupled to the output 110 of the demultiplexer 92, and an inverting input coupled to the output 112 of the demultiplexer 92. A parallel combination of a resistor 272 and a capacitor 274 are coupled between the non-inverting input and the 5 Volt supply line. A parallel combination of a resistor 276 and a capacitor 280 are coupled between the inverting input and ground. The inverting input is coupled to the non-inverting input by a resistor 282. An output of the comparator 240 is coupled to the receive terminal 30.

The circuit 122 provides a comparator circuit which produces an output based upon the standard SAE definition of voltages for "1" and "0s" for the J1939 protocol. The circuit 122 also provides line termination characteristics in accordance with SAE J1939. In particular, the circuit 122 provides a termination impedance of about 10 kohms, and is suitable for a load having a shunt termination at about 2.5 Volts created by two external 120 Ohms impedance-matching line terminations.

The circuit 124 comprises a comparator 290, such as one having part number LM393. The comparator 290 has an inverting input coupled to the output 114 of the demultiplexer 92. A parallel combination of a resistor 292 and a capacitor 294 is coupled between the inverting input and ground. The comparator 292 has a non-inverting input coupled to the battery source by a resistor 296, and coupled to ground by a resistor 300. The comparator 292 has an output coupled to the non-inverting input by a resistor. The output is coupled to the receive terminal.

The circuit 124 provides a comparator circuit which produces an output based upon the standard SAE definition of voltages for "1s" and "0s" for the ISO-9141 protocol. The circuit 124 also provides line termination characteristics in accordance with ISO-9141. In particular, the circuit 124 provides a high termination impedance, and is suitable for a load having an external pull-up resistance of about 1 kOhms to the battery source.

TABLE IV shows part numbers and component values for the various components described with reference to FIG. 2. It is noted that alternative embodiments using alternative components and alternative circuit topologies are also within the scope of the present invention.

TABLE IV

| Component | Part Number/Component Value |
|---|---|
| Multiplexer 50 | 74HC4052 |
| Demultiplexer 92 | 74HC4052 |
| Resistor 94 | 2.55 kOhms |
| Resistor 100 | 2.55 kOhms |
| Inverting Schmitt Trigger 200 | 74HC14 |
| Inverting Schmitt Trigger 202 | 74HC14 |
| Resistor 204 | 100 Ohms |
| Resistor 210 | 100 Ohms |
| Resistor 214 | 1 kOhms |
| Resistor 216 | 22 Ohms |
| Resistor 220 | 1 kOhms |
| Resistor 222 | 22 Ohms |
| Diode 224 | BAV70 |
| Diode 230 | BAV70 |
| Comparator 240 | LM393 |
| Resistor 242 | 2 kOhms |
| Capacitor 244 | 0.001 µF |
| Resistor 246 | 2 kOhms |
| Capacitor 250 | 0.001 µF |
| Resistor 252 | 2 kOhms |
| Resistor 254 | 100 kOhms |
| Inverting Schmitt Trigger 256 | 74HC14 |
| Resistor 260 | 100 kOhms |
| Comparator 270 | LM393 |
| Resistor 272 | 16.5 kOhms |
| Capacitor 274 | 100 pF |

TABLE IV-continued

| Component | Part Number/Component Value |
|---|---|
| Resistor 276 | 16.5 kOhms |
| Capacitor 280 | 100 pF |
| Resistor 282 | 6.04 kOhms |
| Comparator 290 | LM393 |
| Resistor 292 | 200 Ohms |
| Capacitor 294 | 0.01 µF |
| Resistor 296 | 2.55 kOhms |
| Resistor 300 | 200 Ohms |
| Resistor 302 | 20 kOhms |

TABLE V compares an embodiment of a configurable communication circuit as described herein to three dedicated communication circuits. The circuit cost in TABLE V is estimated based on cost per pin of connector pins-and circuit cost per square inch. The circuit area is estimated based on the electrical part only, and does not include trace area.

The configurable communication circuit saves circuit board space (by about 0.28 square inches), has a lesser component cost (by about 36%), and fewer connector pins in comparison to a multiple circuit solution. The configurable circuit frees up to 4 ECM pins if utilization of the three data links are mutually exclusive. Further, the configurable communication circuit allows an engine manufacturer to specify one ECM to meet SAE J1939, SAE J1708 and ISO-9141 requirements.

TABLE V

| | Dedicated J1708, J1939, ISO-9141 circuits | Configurable circuit |
|---|---|---|
| Number of pins | 7 | 3 |
| Microprocessor Resources | 2 SCI, 1 CAN | 1 SCI, 1 CAN |
| Circuit cost | 1 × | 0.64 × |
| Circuit area | 1.74 sq. in 1 × | 1.46 sq. in 0.86 × |

It is noted that alternative processors may be substituted for the microprocessor 10. In general, the microprocessor 10 or alternative processor may be either general purpose or application specific.

The herein-disclosed acts performed by the microprocessor 10 may be directed by contents of a computer-readable medium which encode executable instructions representing a computer program. Examples of the computer-readable medium include, but are not limited to, an electronic medium, a magnetic medium, and an optical medium. The computer-readable medium may comprise either a storage medium such as a memory device, or a communication medium.

It is noted that the herein-described configurable circuit can be applied to a group or class of CAN and SCI protocols of which SAE J1708 and SAE J1939 are a subset. As such, alternative embodiments of the present invention are contemplated which use similar physical layer characteristics of the herein-described configurable circuit to implement a transmitter/receiver interface circuit for a different CAN protocol and a different multiplexed SCI protocol.

In general, the CAN protocol may be selected from the group comprising BOSCH CAN Specification Version 2.0 (Parts A and B), ISO 11898 Road Vehicles—Interchange of Digital Information—Controller Area Network for high speed communication, SAE J1939 Recommended Practice for Serial Control and Communications Vehicle Network (Class C), and SAE J2284 High Speed CAN for Passenger Vehicle Applications. In general, the SCI Protocol may be selected from the group comprising SAE J1708 Serial Data Communications between Microcomputer Systems in Heavy Duty Vehicle Applications, SAE J1587 Joint SAE/TMC Electronic Data Interchange between Microcomputer Systems in Heavy Duty Vehicle Applications, SAE J1922 Powertrain Control Interface for Electronic Controls used in Medium and Heavy Duty Diesel On-Highway Vehicle Applications, EIA RS-485-1983 Electrical Characteristics of Generators and Receivers for-Use in Balanced Digital Multiport Systems, and ISO/IEC 8482:1993 Information Technology—telecommunications and information exchange between systems—twisted-pair multipoint interconnections.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising:
   placing a first communication terminal in a high-impedance state;
   placing a second communication terminal in a high-impedance state;
   sensing a first voltage at the first communication terminal while in the high-impedance state;
   sensing a second voltage at the second communication terminal while in the high-impedance state;
   determining a communication mode based on the first voltage and the second voltage; and
   communicating in the communication mode using the first communication terminal and the second communication terminal.

2. The method of claim 1 wherein the communication mode is based upon a Controller Area Network (CAN) communication protocol.

3. The method of claim 1 wherein the communication mode is based upon a Serial Communications Interface (SCI) communication protocol.

4. The method of claim 1 wherein the communication mode is based upon an ISO-9141 communication protocol.

5. The method of claim 1 wherein said determining comprises:
   determining that the communication mode is based upon a first communication protocol if the first voltage is about 2.5 Volts and the second voltage is about 2.5 Volts;
   determining that the communication mode is based upon a second communication protocol if the first voltage is about 0 Volts and the second voltage is about 5 Volts; and
   determining that the communication mode is based upon a third communication protocol if the first voltage is about 5 Volts and the second voltage is about 5 Volts.

6. A computer-readable medium whose contents cause a processor to place a first communication terminal in a high-impedance state, to place a second communication terminal in a high-impedance state, to sense a first voltage at the first communication terminal while in the high-impedance state, to sense a second voltage at the second communication terminal while in the high-impedance state, to determine a communication mode based on the first voltage and the second voltage, and to communicate in the communication mode using the first communication terminal and the second communication terminal.

7. The computer-readable medium of claim 6 wherein the communication mode is based upon a Controller Area Network (CAN) communication protocol.

8. The computer-readable medium of claim 6 wherein the communication mode is based upon a Serial Communications Interface (SCI) communication protocol.

9. The computer-readable medium of claim 6 wherein the communication mode is based upon an ISO-9141 communication protocol.

10. The computer-readable medium of claim 6 wherein the contents cause the processor to determine the communication mode by determining that the communication mode is based upon a first communication protocol if the first voltage is about 2.5 Volts and the second voltage is about 2.5 Volts, determining that the communication mode is based upon a second communication protocol if the first voltage is about 0 Volts and the second voltage is about 5 Volts, and determining that the communication mode is based upon a third communication protocol if the first voltage is about 5 Volts and the second voltage is about 5 Volts.

11. An apparatus comprising:

a first communication terminal;

a second communication terminal; and a processor to place the first communication terminal in a high-impedance state, to place the second communication terminal in a high-impedance state, to sense a first voltage at the first communication terminal while in the high-impedance state, to sense a second voltage at the second communication terminal while in the high-impedance state, to determine a communication mode based on the first voltage and the second voltage, and to communicate in the communication mode using the first communication terminal and the second communication terminal.

12. The apparatus of claim 11 wherein the communication mode is based upon a Controller Area Network (CAN) communication protocol.

13. The apparatus of claim 11 wherein the communication mode is based upon a Serial Communications Interface (SCI) communication protocol.

14. The apparatus of claim 11 wherein the communication mode is based upon an ISO-9141 communication protocol.

15. The apparatus of claim 11 wherein the processor is to determine the communication mode by determining that the communication mode is based upon a first communication protocol if the first voltage is about 2.5 Volts and the second voltage is about 2.5 Volts, determining that the communication mode is based upon a second communication protocol if the first voltage is about 0 Volts and the second voltage is about 5 Volts, and determining that the communication mode is based upon a third communication protocol if the first voltage is about 5 Volts and the second voltage is about 5 Volts.

* * * * *